(12) United States Patent
Marik et al.

(10) Patent No.: US 11,536,481 B2
(45) Date of Patent: Dec. 27, 2022

(54) DISTRIBUTED SET POINT CONFIGURATION IN HEATING, VENTILATION, AND AIR-CONDITIONING SYSTEMS

(71) Applicant: Honeywell International Inc., Morris Plains, NJ (US)

(72) Inventors: Karel Marik, Revnice (CZ); Petr Endel, Prague (CZ); Raman Samusevich, Prague (CZ)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/594,872

(22) Filed: Oct. 7, 2019

(65) Prior Publication Data

US 2021/0102724 A1 Apr. 8, 2021

(51) Int. Cl.
*G05B 15/02* (2006.01)
*F24F 11/63* (2018.01)

(52) U.S. Cl.
CPC .............. *F24F 11/63* (2018.01); *G05B 15/02* (2013.01)

(58) Field of Classification Search
CPC ................................. F24F 11/63; G05B 15/02
USPC ......................................................... 700/277
See application file for complete search history.

(56) References Cited

U.S. PATENT DOCUMENTS

| 2014/0277760 A1 | 9/2014 | Marik et al. |
| 2015/0083813 A1 | 3/2015 | Chen et al. |
| 2016/0223218 A1* | 8/2016 | Barrett ..................... F24F 11/30 |
| 2018/0113482 A1* | 4/2018 | Vitullo ............... G05D 23/1917 |

(Continued)

FOREIGN PATENT DOCUMENTS

| CN | 101023718 A | 8/2007 |
| CN | 105783112 A | 7/2016 |

(Continued)

OTHER PUBLICATIONS

Moriyama et al., 2018, Reinforcement Learning Testbed for Power-Consumption Optimization, [online article] [retrieved Mar. 30, 2020] retrieved from the Internet URL: https://arxiv.org/abs/1808.10427, 15 pages.

(Continued)

*Primary Examiner* — Michael W Choi
(74) *Attorney, Agent, or Firm* — Alston & Bird LLP

(57) ABSTRACT

Method, apparatus and computer program product for generating a supply stream temperature set-point for a particular distribution channel element associated with a heating, ventilation, and air-conditioning (HVAC) system. In one example, a method includes identifying a hierarchical position of the particular distribution channel element; identifying potential set point configuration actions associated with the particular distribution channel element, wherein each potential set point configuration action is expected to cause transition of the particular distribution channel element from a current state to a future state; determining an overall cost measure for each potential set point configuration action based at least in part on the hierarchical position of the particular distribution channel element, and generating the supply stream temperature set-point based on each overall cost measure associated with a potential set point configuration action.

20 Claims, 7 Drawing Sheets

(56) References Cited

U.S. PATENT DOCUMENTS

2019/0017719 A1* 1/2019 Sinha .................. G05B 15/02
2019/0032945 A1   1/2019 Willmott et al.
2019/0338974 A1* 11/2019 Turney ................. F24F 11/70
2019/0353379 A1* 11/2019 Lee ..................... G05B 15/02

FOREIGN PATENT DOCUMENTS

| CN | 106066077 A | 11/2016 |
|----|-------------|---------|
| CN | 109416191 A | 3/2019 |
| EP | 3312698 A1 | 4/2018 |

OTHER PUBLICATIONS

Extended European Search Report issued in European Application No. 20199465.4 dated Feb. 15, 2021, 7 pages.
Examination Report No. 1 issued in Australian Application No. 2020244508 dated Aug. 12, 2021, 4 pages.
CN Office Action dated Nov. 1, 2021 for CN Application No. 202011074648.
English Translation of CN Office Action dated Nov. 1, 2021 for CN Application No. 202011074648.
Li, Wen et al., Research and Realization of Optimal Working Strategic of Branched Fluid Heating Network, Feb. 6, 2009, Microcomputer Information, 215-217.
English Translation of CN Office Action dated Aug. 3, 2022 for CN Application No. 202011074648.

\* cited by examiner

DISTRIBUTED SET POINT CONFIGURATION IN HEATING, VENTILATION, AND AIR-CONDITIONING SYSTEMS

BACKGROUND

Applicant has identified many deficiencies and problems associated with existing methods, apparatus, and systems related to managing heating-ventilation, and air-conditioning (HVAC) systems. Through applied effort, ingenuity, and innovation, many of these identified deficiencies and problems have been solved by developing solutions that are in accordance with embodiments of the present disclosure, many examples of which are described in detail herein.

BRIEF SUMMARY

In general, embodiments of the present disclosure provide methods, apparatus, systems, devices, and/or the like for managing HVAC systems by utilizing distributed generation of supply stream temperature set-point values (e.g., supply stream temperature set-point values) utilized in such systems and/or by utilizing reinforcement learning.

In accordance with one aspect, an apparatus is provided. The apparatus comprises at least one processor and at least one non-transitory memory comprising program code. The at least one non-transitory memory and the program code are configured to, with the at least one processor, cause the apparatus to perform a method for generating a supply stream temperature set-point for a particular distribution channel element of a plurality of distribution channel elements associated with a heating, ventilation, and air-conditioning (HVAC) system, the computer-implemented method comprising: identifying a hierarchical position of the particular distribution channel element within a hierarchical architecture of the plurality of distribution channel elements; identifying a plurality of potential set point configuration actions associated with the particular distribution channel element, wherein each potential set point configuration action of the plurality of potential set point configuration actions is expected to cause transition of the particular distribution channel element from a current state of a plurality of potential states to a future state of the plurality of potential states; for each potential set point configuration action of the plurality of potential set point configuration actions, determining an overall cost measure for the potential set point configuration action based at least in part on the hierarchical position of the particular distribution channel element; and generating the supply stream temperature set-point based on each overall cost measure associated with a potential set point configuration action of the plurality of potential set point configuration actions.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention. It will be appreciated that the scope of the invention encompasses many potential embodiments in addition to those here summarized, some of which will be further described below.

BRIEF DESCRIPTION OF THE DRAWINGS

Figure 1:
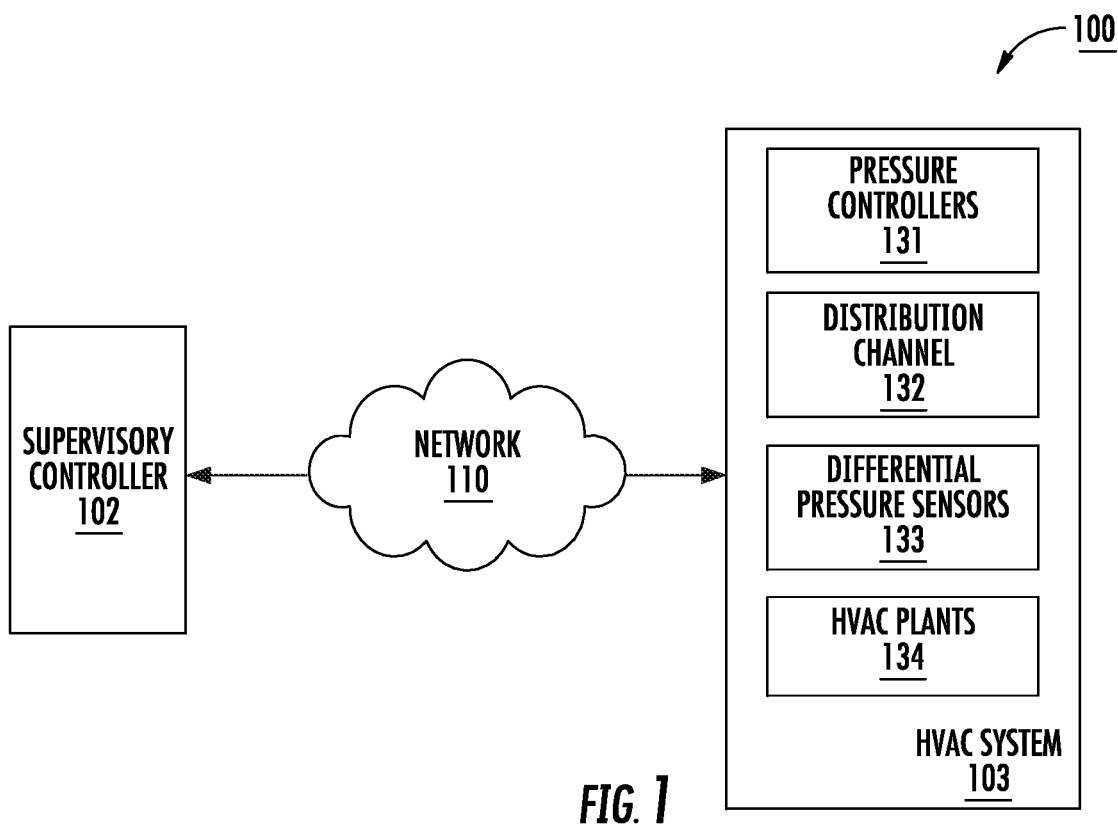

Having thus described some embodiments in general terms, references will now be made to the accompanying drawings, which are not necessarily drawn to scale, and wherein:

FIG. 1 is an example system architecture within which embodiments of the present disclosure may operate.

Figure 2:
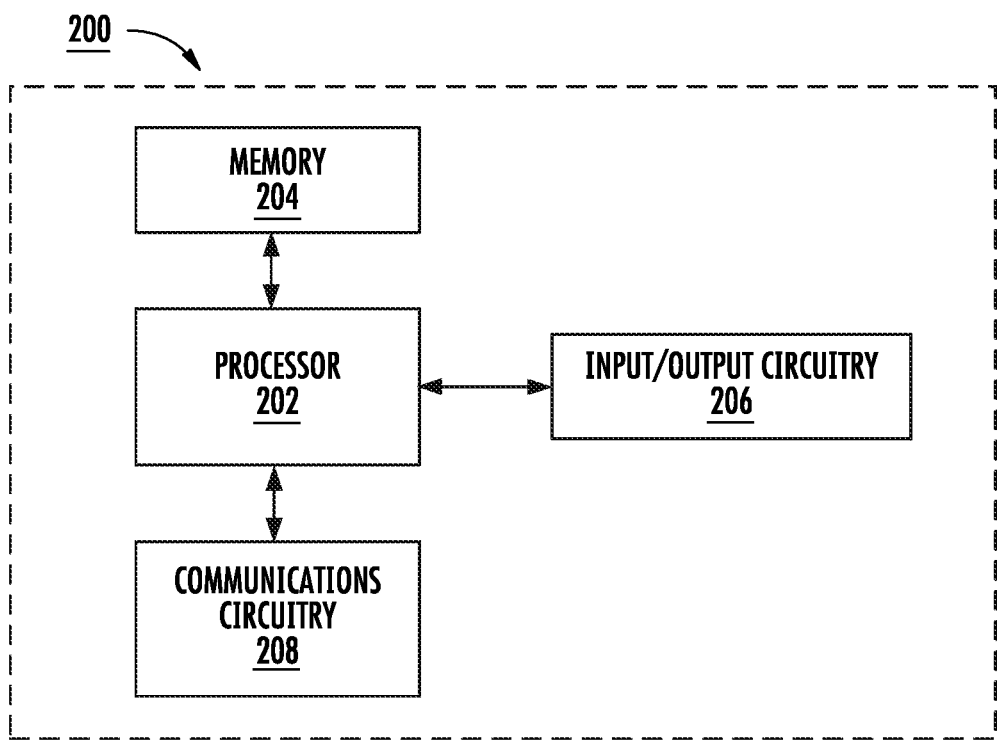

FIG. 2 is a schematic diagram of an example apparatus for a supervisory controller in accordance with one embodiment of the present disclosure.

Figure 3:
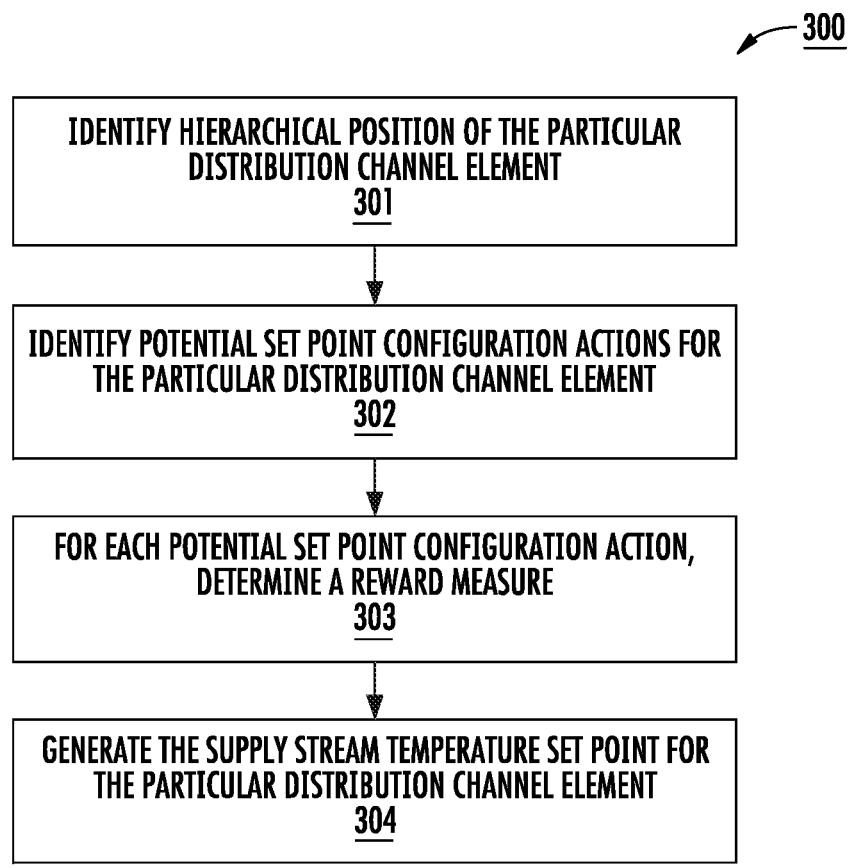

FIG. 3 is a flowchart diagram of an example process for generating a supply stream temperature set-point for a particular distribution channel element in an HVAC system in accordance with one embodiment of the present disclosure.

Figure 4:
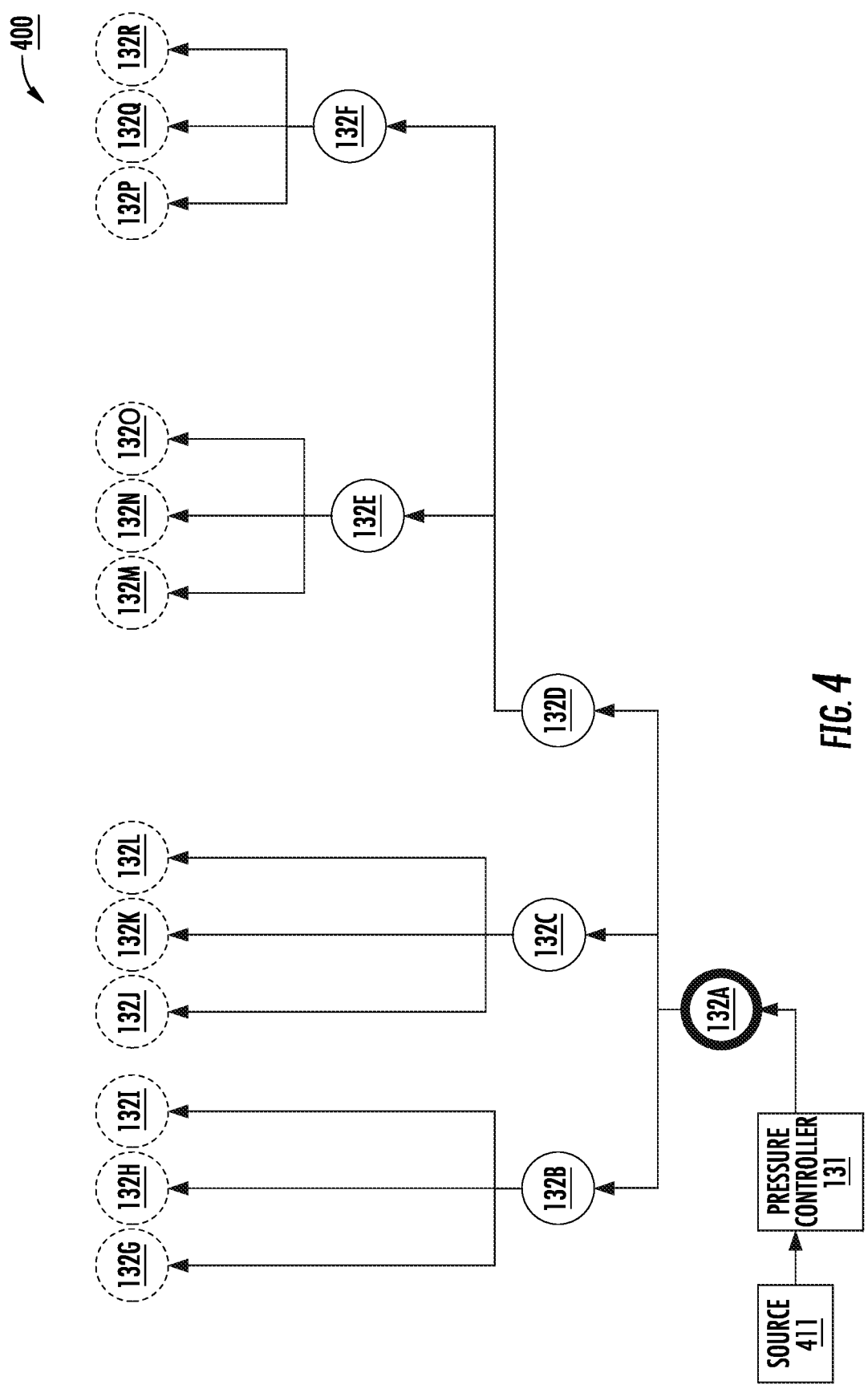

FIG. 4 is an operational example of a hierarchical architecture for various distribution channel elements of an HVAC system in accordance with one embodiment of the present disclosure.

Figure 5:
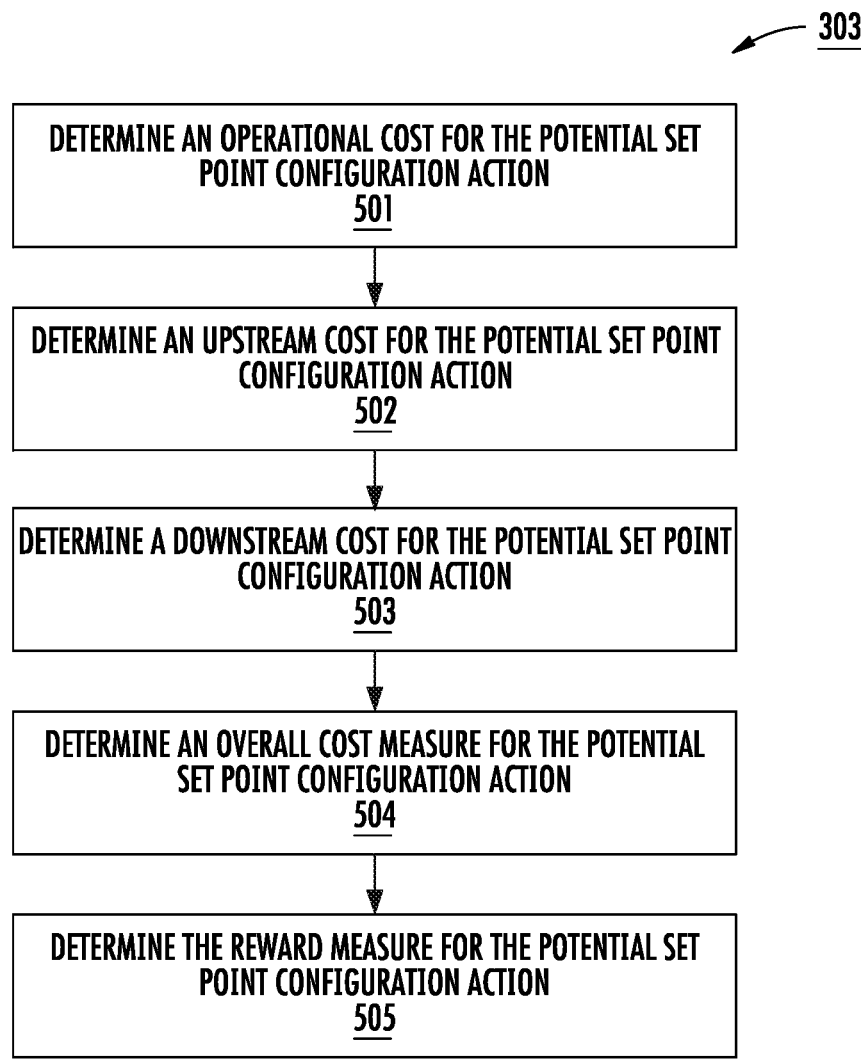

FIG. 5 is a flowchart diagram of an example process for determining a reward measure for a particular potential set point configuration action with respect to a particular distribution channel element in accordance with one embodiment of the present disclosure.

Figure 6:
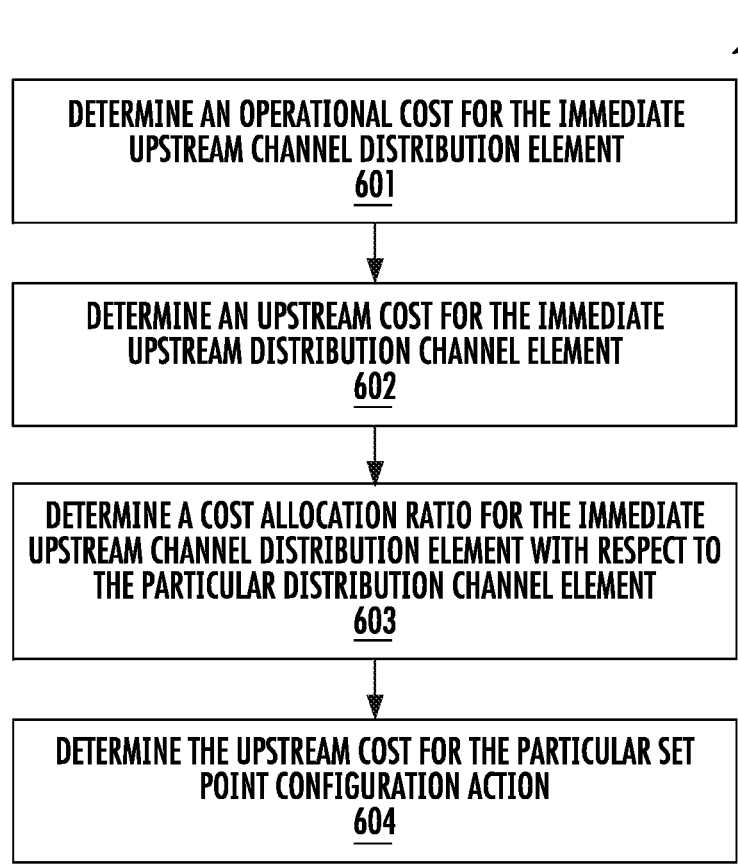

FIG. 6 is a flowchart diagram of an example process for determining an upstream cost for a potential set point configuration action based on a hierarchical position of a distribution channel element in accordance with one embodiment of the present disclosure.

Figure 7:
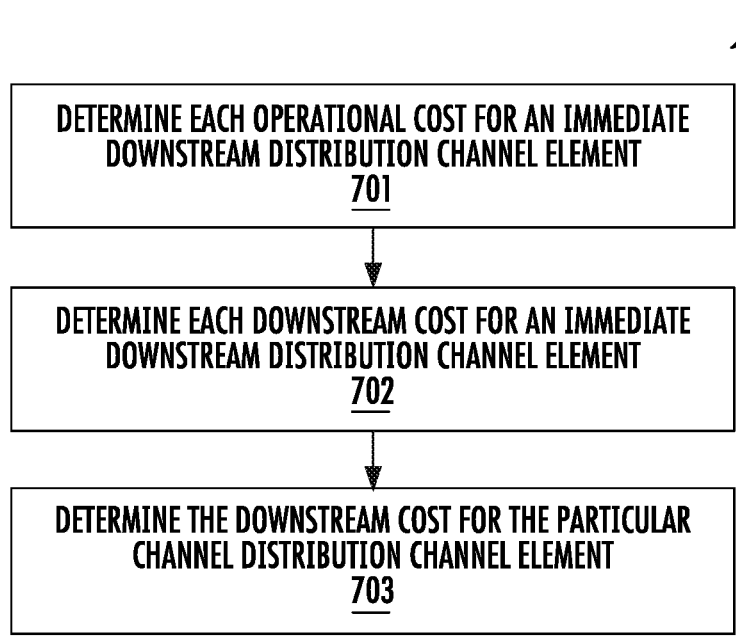

FIG. 7 is a flowchart diagram of an example process for determining a downstream cost for a potential set point configuration action based on operational costs and downstream costs in accordance with one embodiment of the present disclosure.

Figure 8:
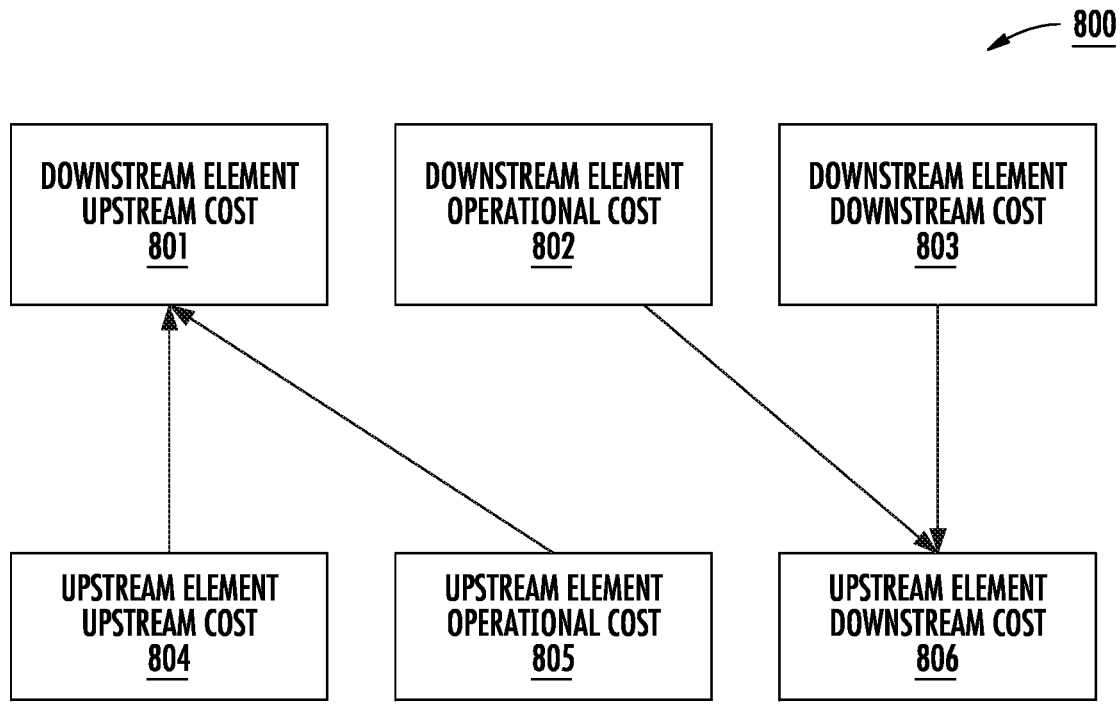

FIG. 8 is an operational example of a hierarchical transition diagram for determining a downstream cost for a potential set point configuration action based on operational costs and downstream costs in accordance with one embodiment of the present disclosure.

Figure 9:
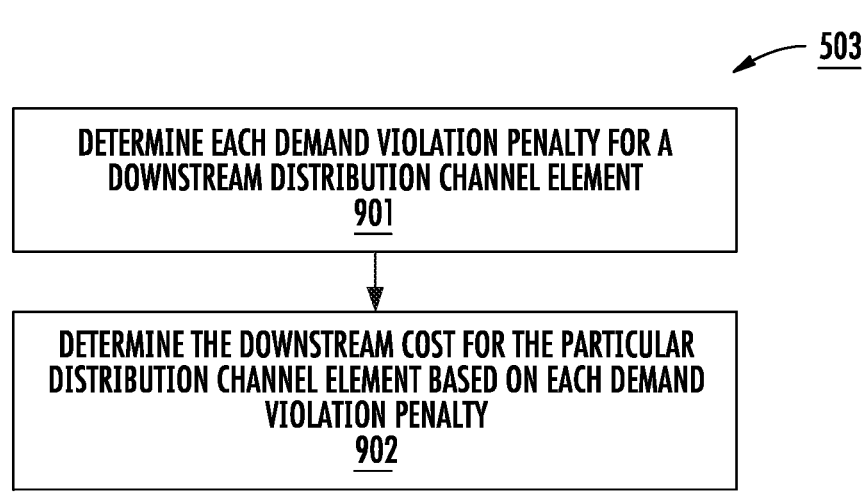

FIG. 9 is a flowchart diagram of an example process for determining a downstream cost for a potential set point configuration action based on downstream demand violation penalties in accordance with one embodiment of the present disclosure.

Figure 10:
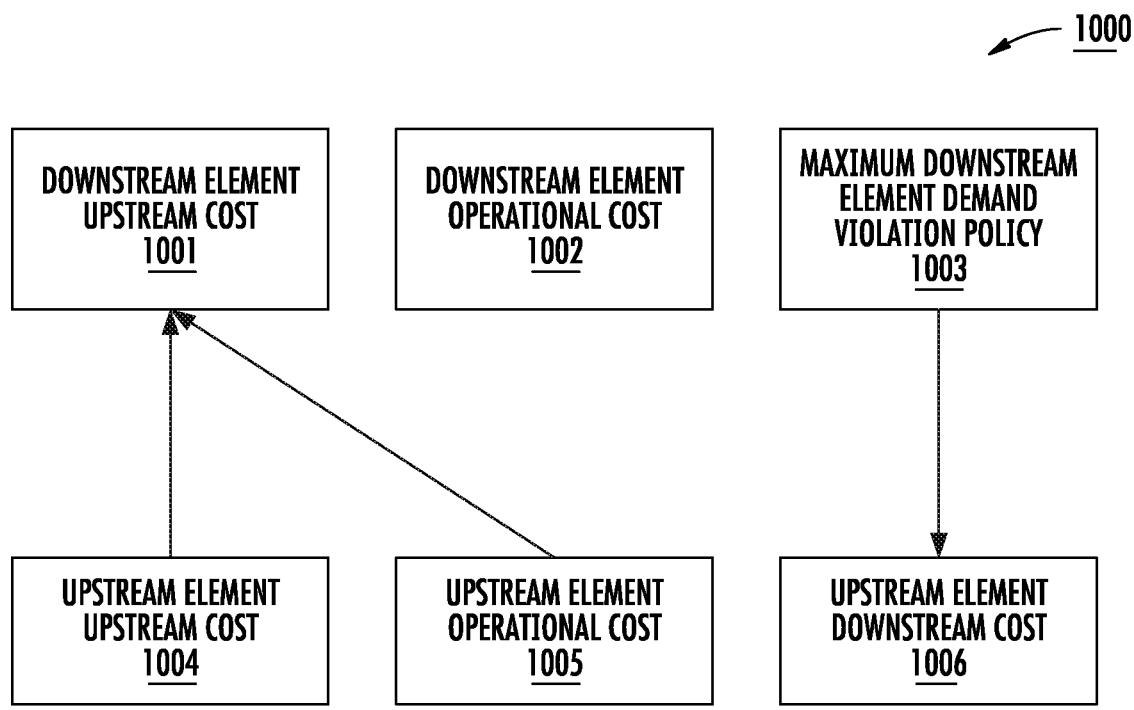

FIG. 10 is an operational example of a hierarchical transition diagram for determining a downstream cost for a potential set point configuration action based on downstream demand violation penalties in accordance with one embodiment of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a device is described herein to receive data from another device, it will be appreciated that the data may be received directly from another device or may be received indirectly via one or more intermediary devices, such as, for example, one or more servers, relays, routers, network access points, base stations, hosts, and/or the like (sometimes referred to herein as a "network"). Similarly, where a device is described herein to send data to another device, it will be appreciated that the data may be sent directly to another device or may be sent indirectly via one or more intermediary devices, such as, for example, one or more servers, relays, routers, network access points, base stations, hosts, and/or the like.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

Overview

Various embodiments of the present invention disclose innovative techniques for generating set points in HVAC systems using distributed reinforcement learning by utilizing hierarchical dependencies between various set point configuration nodes within a hierarchical architecture imposed on the distribution channels of such HVAC systems. The noted techniques enable deploying effective HVAC systems in structurally complex buildings while maintaining efficiency and scalability of such systems. In doing so, various embodiments of the present invention make important technical contributions to efficiency, reliability, and scalability of HVAC systems. Moreover, the disclosed techniques for hierarchically distributed reinforcement learning can be utilized outside the context of HVAC systems (e.g., in other contexts with multiple sensors and multiple operational variables), thus leading to efficient and effective reinforcement learning solutions that make substantial contributions to machine learning and artificial intelligence.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the device may include fixed devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 depicts an architecture 100 for performing supervisory control of a HVAC system 103. The architecture 100 includes a supervisory controller 102 that interacts with the HVAC system 103. The supervisory controller 102 is configured to generate supervisory control signals that control the operation of the HVAC system 103. The supervisory controller 102 may generate the supervisory control signals based on supervisory control strategies provided to the supervisory controller 102 by an administrative user profile of the HVAC system 103, e.g., an administrative user profile that interacts directly with the supervisory controller 102 and/or an administrative user profile that interacts with the supervisory controller 102 via an administrative computing device and a communication network 110.

The supervisory controller 102 is configured to interact with the HVAC system 103 via a communication network 110. The communication network 110 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 110 may include a cellular telephone, an 902.11, 902.16, 902.20, and/or WiMax network. Further, the communication network 110 may include a public network, such as the Internet, a private network, such as an intranet, or combinations thereof, and may utilize a variety of networking protocols now available or later developed including, but not limited to TCP/IP based networking protocols. In one embodiment, the protocol is a custom protocol of JSON objects sent via a Websocket channel. In one embodiment, the protocol is JSON over RPC, JSON over REST/HTTP, and the like.

The HVAC system 103 is configured to maintain desired comfort levels for one or more buildings and/or one or more campuses in accordance with one or more desired energy cost models. The comfort model maintained by the HVAC system may be defined based on one or more of temperature, humidity, carbon dioxide level, etc. To modify comfort levels and/or energy consumption levels, the HVAC system 103 may modify one or more HVAC operational variables, such as one or more of water temperatures, air temperatures, water pump speeds, fan speeds, etc. The HVAC system 103 includes a pressure controller 131, a distribution channel 132, differential pressure sensors 133, and HVAC units 134.

The pressure controller 131 (e.g., a water pump or air fan) controls distribution of a cooling agent and/or a heating agent (e.g., hot water, hot air, chilled water, cool air, etc.) within the distribution channel 132, where the distribution channel may include water pipes or air ducts. The distribution channel 132 may include various distribution branches, each of which may be associated with a particular physical zone of the buildings and/or campuses covered by the HVAC system 103. Each differential pressure sensor 133 may sense differential pressures (e.g., differential water pressures or differential air pressures) within a particular distribution branch and provide its generated differential pressure readings to the supervisory controller 102 via the communication network 110. The supervisory controller 102 may then process the differential pressure readings in accordance with its enforced supervisory control strategy in order to generate supervisory control signals that are in turn transmitted via the communication network 110 to the HVAC system 103.

An example architecture for a supervisory controller 102 is depicted in the apparatus 200 of FIG. 2. As depicted in FIG. 2, the apparatus 200 includes processor 201, memory 203, input/output circuitry 205, and communications circuitry 207. Although these components 201-207 are described with respect to functional limitations, it should be understood that the particular implementations necessarily include the use of particular hardware. It should also be understood that certain of these components 201-207 may include similar or common hardware. For example, two sets of circuitries may both leverage use of the same processor, network interface, storage medium, or the like to perform their associated functions, such that duplicate hardware is not required for each set of circuitries.

In one embodiment, the processor 201 (and/or co-processor or any other processing circuitry assisting or otherwise associated with the processor) may be in communication with the memory 203 via a bus for passing information among components of the apparatus. The memory 203 is non-transitory and may include, for example, one or more volatile and/or non-volatile memories. In other words, for example, the memory 203 may be an electronic storage device (e.g., a computer-readable storage medium). The memory 203 may be configured to store information, data, content, applications, instructions, or the like for enabling the apparatus 200 to carry out various functions in accordance with example embodiments of the present disclosure.

The processor 201 may be embodied in a number of different ways and may, for example, include one or more processing devices configured to perform independently. In some preferred and non-limiting embodiments, the processor 201 may include one or more processors configured in tandem via a bus to enable independent execution of instructions, pipelining, and/or multithreading.

In some preferred and non-limiting embodiments, the processor 201 may be configured to execute instructions stored in the memory 203 or otherwise accessible to the processor 201. In some preferred and non-limiting embodiments, the processor 201 may be configured to execute hard-coded functionalities. As such, if configured by hardware or software methods, or by a combination thereof, the processor 201 may represent an entity (e.g., physically embodied in circuitry) capable of performing operations according to an embodiment of the present disclosure while configured accordingly. Alternatively, as another example, when the processor 201 is embodied as an executor of software instructions, the instructions may specifically configure the processor 201 to perform the algorithms and/or operations described herein when the instructions are executed.

In one embodiment, the apparatus 200 may include input/output circuitry 205 that may, in turn, be in communication with processor 201 to provide output to the user and, In one embodiment, to receive an indication of a user input. The input/output circuitry 205 may comprise a user interface and may include a display, and may comprise a web user interface, a mobile application, a client device, a kiosk, or the like. In one embodiment, the input/output circuitry 205 may also include a keyboard, a mouse, a joystick, a touch screen, touch areas, soft keys, a microphone, a speaker, or other input/output mechanisms.

The communications circuitry 207 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 207 may include, for example, a network interface for enabling communications with a wired or wireless communication network. For example, the communications circuitry 207 may include one or more network interface cards, antennae, buses, switches, routers, modems, and supporting hardware and/or software, or any other device suitable for enabling communications via a network. Additionally or alternatively, the communications circuitry 207 may include the circuitry for interacting with the antenna/antennae to cause transmission of commands via the antenna/antennae or to handle receipt of commands received via the antenna/antennae.

It is also noted that all or some of the information discussed herein can be based on data that is received, generated and/or maintained by one or more components of apparatus 200. In one embodiment, one or more external systems (such as a remote cloud computing and/or data storage system) may also be leveraged to provide at least some of the functionality discussed herein.

In one embodiment, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 200 may provide or supplement the functionality of particular circuitry. For example, the processor 201 may provide processing functionality, the memory 203 may provide storage functionality, the communications circuitry 207 may provide network interface functionality, and the like.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows of Embodiments of the Present Disclosure

Various embodiments of the present invention disclose innovative techniques for generating set points in HVAC systems using distributed reinforcement learning by utilizing hierarchical dependencies between various set point configuration nodes within a hierarchical architecture imposed on the distribution channels of such HVAC systems. The noted techniques enable deploying effective HVAC systems in structurally complex buildings while maintaining efficiency and scalability of such systems. In doing so, various embodiments of the present invention make important technical contributions to efficiency, reliability, and scalability of HVAC systems. Moreover, the disclosed techniques for hierarchically distributed reinforcement learning can be utilized outside the context of HVAC systems (e.g., in other contexts with multiple sensors and multiple operational variables), thus leading to efficient and effective reinforcement learning solutions that make substantial contributions to machine learning and artificial intelligence.

FIG. 3 is a flowchart diagram of an example process 300 for generating a supply stream temperature set-point for a particular distribution channel element in the HVAC system 103. Via the various operations of process 300, the supervisory controller 102 can adjust various supply stream temperature set-points associated with an HVAC system 103 in order to increase efficiency of the HVAC system 103 while maintaining desired comfort levels provided by the HVAC system 103. The process 300 can be performed with respect to each distribution channel element of various distribution channel elements in the HVAC system 103 in order to generate optimal set points for all of the noted various distribution channel elements.

The process 300 begins at operation 301 when the supervisory controller 102 identifies a hierarchical position of the particular distribution channel element within a hierarchical architecture of the distribution channel elements associated with the HVAC system 103. In some embodiments, the hierarchical architecture of the distribution channel elements associated with the HVAC system 103 indicates, for each distribution channel element of the distribution channel elements, at least one of one or more upstream distribution channel elements and one or more downstream distribution channel elements. In some embodiments, when a first distribution channel element is upstream to a second distribution channel element, the first distribution channel element supplies heating agents and/or cooling agents prior to the second distribution channel element. In some embodiments, when a first distribution channel element is downstream to a second distribution channel element, the second distribution channel element is architecturally designed to receive particular flows of heating agents and/or cooling agents prior to the first distribution channel element.

An operational example of a hierarchical architecture 400 for various distribution channel elements 132A-R of an HVAC system 103 is presented in FIG. 4. As depicted in FIG. 4, the hierarchical architecture 400 connects a source 411 of heating agents and/or cooling agents to the various distribution channel elements 132A-R of an HVAC system 103, where a pressure controller 131 controls flow of heating agents and/or cooling agents from the source 411 to the various distribution channel elements 132A-R. The various distribution channel elements 132A-R include a root distribution channel element 132A that receives heating agents and/or cooling agents directly from the pressure controller 131 and thus is upstream to all the remaining distribution channel elements 132B-R. The root distribution channel element 132A has no upstream distribution channel elements among the various distribution channel elements 132A-R and thus is upstream to all the remaining distribution channel elements 132B-R. The root distribution channel element 132A has three immediate downstream distribution channel elements 132B-D and seventeen total downstream distribution channel elements 132B-R. The root distribution channel element 132A may regulate flow and/or temperature of a heating agent and/or a cooling agent for the entire HVAC system 103, e.g., in order to regulate comfort levels of one or more buildings and/or one or more campuses.

The various distribution channel elements 132A-R of the hierarchical architecture 400 further include leaf distribution channel elements 132G-R that may provide outputs of the HVAC system 103 for various zones (e.g., rooms) within the one or more buildings and/or the one or more campuses covered by the HVAC system 103. The leaf distribution channel elements 132G-R may thus connect to HVAC units 134 within various zones of buildings and/or campuses. The leaf distribution channel elements 132G-R have no downstream distribution channel elements among the various distribution channel elements 132A-R and thus are downstream to all the remaining distribution channel elements 132A-F. In other words, each downstream distribution channel element 132G-R has various upstream distribution channel elements including an immediate upstream distribution channel element. For example, leaf distribution channel element 132G has upstream distribution channel elements 132A-B, including an immediate upstream distribution channel element 132B.

The various distribution channel elements 132A-R of the hierarchical architecture 400 further include secondary-level distribution channel elements 132B-D that each depend from the root distribution channel element 132A as well as tertiary-level distribution channel elements 132E-F that each depend from the secondary-level distribution channel element 132D. The secondary-level distribution channel elements 132B-D include secondary-level distribution channel element 132B that is an immediate upstream to leaf distribution channel elements 132G-I, secondary-level distribution channel element 132C that is an immediate upstream to leaf distribution channel elements 132J-L, and secondary-level distribution channel element 132D that is an immediate upstream to ternary-level distribution channel elements 132E-F. The ternary-level distribution channel elements 132E-F include the ternary-level distribution channel element 132E that is an immediate upstream to leaf distribution channel elements 132M-O and the ternary-level distribution channel element 132F that is an immediate upstream to leaf distribution channel elements 132P-R.

While the exemplary hierarchical architecture 400 of FIG. 4 is depicted using distribution channel elements 132A-R with four hierarchical levels (i.e., the root level, the secondary level, the ternary level, and the leaf level), a person of ordinary skill in the relevant technology will recognize that a hierarchical architecture of distribution channel elements for an HVAC system 103 may have any number of two or more hierarchical levels. Moreover, while the exemplary hierarchical architecture 400 of FIG. 4 is depicted using one root distribution channel element 132A, a person of ordinary skill in the relevant technology will recognize that a hierarchical architecture of distribution channel elements for an HVAC system 103 may have any number of root distribution channel elements.

Returning to FIG. 3, at operation 302, the supervisory controller 102 identifies potential set point configuration actions for the particular distribution channel element. In some embodiments, each distribution channel element is associated with one or more set points which may define desired and/or optimal values for flow and/or temperature of heating agents and/or cooling agents within a segment of the distribution channel 132 of the HVAC system 103 that corresponds to the distribution channel element. In some embodiments, each potential set point configuration action is associated with a set point category of a plurality of set point categories, such as a flowrate set point category and a temperature set point category. In some embodiments, each potential set point configuration action is associated with a discrete set point modification value of a plurality of discrete set point modification values, such as a discrete set point modification value associated with decreasing a set point by ten percent or a discrete set point modification value associated with increasing a set point by twenty percent. In some embodiments, each potential set point configuration action is associated with a continuous set point modification range (e.g., a one-value range or a multi-value range) of a plurality of continuous set point modification ranges. In general, each potential set point configuration action is selected from a continuous range of set point configuration actions.

In some embodiments, the potential set point configuration actions are defined based on at least one of the plurality of set point categories, the plurality of discrete set point modification values, and the plurality of continuous set point modification ranges. For example, given the plurality of set point categories including a flowrate set point category and a temperature set point category, and further given the plurality of discrete set point modification values including a first discrete set point modification value associated with decreasing a set point by ten percent, a second discrete set point modification value associated with not changing a set point, and a third discrete set point modification value associated with increasing a set point by ten percent, the supervisory controller 102 may define the following nine potential set point configuration actions: decreasing both the flowrate set point and the temperature set point by ten percent, decreasing the flowrate set point by ten percent and not changing the temperature set point, decreasing the flowrate set point by ten percent and increasing the temperature set point by ten percent, not changing either the flowrate set point or the temperature set point, not changing the flowrate set point and decreasing the temperature set point by ten percent, not changing the flowrate set point and increasing the temperature set point by ten percent, increasing both the flowrate set point and the temperature set point by ten percent, increasing the flowrate set point by ten percent and not changing the temperature set point, and increasing the flowrate set point by ten percent and decreasing the temperature set point by ten percent.

In some embodiments, the supervisory controller 102 defines a range of potential set point configuration actions for the particular distribution channel element based on a discrete or continuous range of potential states for the particular distribution channel element. In some embodiments, the supervisory controller 102 defines the discrete or continuous range of potential states for the particular distribution channel element based on ranges for one or more operational properties associated with the particular distribution channel element. For example, the supervisory controller 102 may define the discrete or continuous range of potential states for the particular distribution channel element based on one or more of possible operational demands of any downstream distribution channel elements and/or dependent HVAC units 134 associated with the particular distribution channel, a range of external temperatures for buildings and/or campuses associated with the HVAC system 103, a range of potential user configurations associated with the HVAC system 103, etc. Examples of potential states for distribution channel elements include potential states that correspond to one or more of sensed downstream units demands, sensed supply water temperatures and/or air temperatures, sensed supply water flow rates and/or air flow rates, actual values of set points, actual values of comfort constraints, etc.

In some embodiments, a potential set point configuration action for the particular distribution channel element is an event configured to cause transition of the particular distribution channel element from a current state to a future state, where the future state may be the same as or different from the current state. In some embodiments, a potential set point configuration action for the particular distribution channel element is an event configured to cause a predefined likelihood of transition of the particular distribution channel element from a current state to a future state, where the future state may be the same as or different from the current state. In some embodiments, the supervisory controller 102 maintains a state-action-state transition probability distribution that defines a likelihood that performance of particular potential set point configuration actions would cause a transition from particular first potential states to particular second potential states. For example, the state-action-state transition probability distribution maintained by the supervisory controller 102 may define, for each triplet of a current state $x_i$, a particular potential set point configuration action $u_i$, and a future state $x_{i+1}$, a likelihood that performance of the potential set point configuration action $u_i$ will cause a transition from the current state $x_i$ to the future state $x_{i+1}$.

At operation 303, the supervisory controller 102 determines a reward measure for each potential set point configuration action. The reward measure for a potential set point configuration action may be an immediate benefit of the potential set point configuration action. In some embodiments, the supervisory controller 102 determines a reward measure for a potential set point configuration action based on a cost measure associated with the potential set point configuration action. In some embodiments, the supervisory controller 102 uses the generated reward measures for the potential set point configuration actions along with transition probabilities for the potential set point configuration actions as part of an iteration of a Markov Decision Process in order to detect an optimal potential set point configuration action given a current state of the particular distribution channel element. In some embodiments, the reward measures for potential set point configuration actions may be positive, negative, or zero values. In some embodiments, the reward measures for potential set point configuration actions are used to learn a value function during training.

In some embodiments, operation 303 can be performed in accordance with the operations depicted in FIG. 5, which is a flowchart diagram of an example process for determining a reward measure for a particular potential set point configuration action with respect to a particular distribution channel element of an HVAC system 103. The process depicted in FIG. 5 begins at operation 501 when the supervisory controller 102 determines an operational cost for the particular potential set point configuration action. The operational cost for the particular potential set point configuration action may be an expected cost associated with the operation of HVAC system 103 components corresponding to the particular distribution channel element in the event of performance of the particular potential set point configuration action, such as costs associated with wear-and-tear of any HVAC system 103 components, future maintenance needs of any HVAC system 103 components, etc. Importantly, the operational costs may be modeled as individual costs for the particular distribution channel element that are determined without regard to input from any upstream distribution channel elements for the particular distribution channel element and/or any downstream distribution channel elements for the particular distribution channel element.

At operation 502, the supervisory controller 102 determines an upstream cost for the particular potential set point configuration action based on the hierarchical position of the particular distribution channel element. In some embodiments, the supervisory controller 102 determines an upstream cost for the particular potential set point configuration action with respect to the particular distribution channel element based on data provided by at least one upstream distribution channel element for the particular distribution channel element. In some embodiments, the supervisory controller 102 determines an upstream cost for the particular potential set point configuration action with respect to the particular distribution channel element based on data provided by the immediate upstream distribution channel element for the particular distribution channel element.

In some embodiments, operation 502 may be performed in accordance with the operations depicted in FIG. 6, which is a flowchart diagram of an example process for determining an upstream cost for a particular potential set point configuration action with respect to a particular distribution channel element based on a hierarchical position of the particular distribution channel element. The process depicted in FIG. 6 can be performed in an iterative manner to generate upstream costs for all distribution channel elements associated with an HVAC system 103 based on upstream costs and operational costs of upstream distribution channel elements as well as preconfigured upstream costs of the root distribution channel element. The process depicted in FIG. 6 begins at operation 601 when the supervisory controller 102 determines the operational cost for an immediate upstream distribution channel element for the particular distribution channel element.

At operation 602, the supervisory controller 102 determines the upstream cost for the immediate upstream distribution channel element for the particular distribution channel element. In some embodiments, the supervisory controller 102 generates the upstream cost for a root distribution channel element based on operational costs and upstream costs of immediate upstream distribution channel elements for the distribution channel element.

At operation 603, the supervisory controller 102 determines a cost allocation ratio for the immediate upstream distribution channel element with respect to the particular distribution channel element, where the cost allocation ratio for the immediate upstream distribution channel element with respect to the particular distribution channel element may indicate a ratio of a sum of the operational cost for the immediate upstream distribution channel and the upstream cost for the immediate upstream distribution channel that should be transferred downstream to the particular distribution channel element. In some embodiments, when a particular distribution channel element has a particular number of immediate downstream distribution channel elements, the sum of the cost allocation ratios for the particular number of immediate downstream distribution channel elements equals one.

At operation 604, the supervisory controller 102 determines the upstream cost for the particular potential set point configuration action with respect to the particular distribution channel element based on the operational cost for the immediate upstream distribution channel element associated with the particular distribution channel element, the upstream cost for the immediate upstream distribution channel element associated with the particular distribution channel element, and the cost allocation ratio for the immediate upstream distribution channel element with respect to the particular distribution channel element. In some embodiments, to determine the upstream cost $c_{r,i}$ for the particular potential set point configuration action with respect to the particular distribution channel element, the supervisory controller 102 performs operations described by the equation $c_{r,i}=K_i(c_{r,u}+c_{o,u})$, where $K_i$ is the cost allocation ratio of the immediate upstream distribution channel element for the particular distribution channel element with respect to the particular distribution channel element, $c_{r,u}$ is the upstream cost of the immediate upstream distribution channel element associated with the particular distribution channel element, and $c_{o,u}$ is the operational cost of the immediate upstream distribution channel element associated with the particular distribution channel element.

Returning to FIG. 5, at operation 503, the supervisory controller 102 determines a downstream cost for the particular potential set point configuration action based on the hierarchical position of the particular distribution channel element. In some embodiments, the supervisory controller 102 determines a downstream cost for the particular potential set point configuration action with respect to the particular distribution channel element based on data provided by at least one downstream distribution channel element for the particular distribution channel element. In some embodiments, the supervisory controller 102 determines a downstream cost for the particular potential set point configuration action with respect to the particular distribution channel element based on data provided by each immediate downstream distribution channel element for the particular distribution channel element.

In some embodiments, operation 503 may be performed in accordance with the operations depicted in FIG. 7, which is a flowchart diagram of an example process for determining a downstream cost for a particular potential set point configuration action with respect to a particular distribution channel element based on operational costs and downstream costs of downstream distribution channel elements associated with the particular distribution channel element. The process depicted in FIG. 7 can be performed in an iterative manner to generate downstream costs for all distribution channel elements associated with an HVAC system 103 based on downstream costs and operational costs of downstream distribution channel elements as well as preconfigured downstream costs of the leaf distribution channel elements. The process depicted in FIG. 7 begins at operation 701 when the supervisory controller 102 determines the operational cost for each immediate downstream distribution channel element for the particular distribution channel element.

At operation 702, the supervisory controller 102 determines the downstream cost for each immediate downstream distribution channel element for the particular distribution channel element. In some embodiments, if an immediate downstream distribution channel is a leaf distribution channel element associated with one or more covered building zones 103 of a plurality of building zones associated with the HVAC system, the supervisory controller 102 determines the downstream cost for the leaf distribution channel element based on a maximum zone comfort violation penalty (e.g., a maximum deviation from optimal and/or desired level of quality service) for a covered building zone of the one or more covered building zones for the leaf channel distribution element. In some embodiments, if an immediate downstream distribution channel is not a leaf distribution channel element, the supervisory controller 102 determines the downstream cost for the non-leaf distribution channel element based on each operational cost and each downstream cost for any immediate downstream distribution channel element associated with the non-leaf distribution channel element.

At operation 703, the supervisory controller 102 determines the downstream cost for the particular distribution channel element based on each operational cost and each downstream cost for an immediate downstream distribution channel element associated with the particular distribution channel element. In some embodiments, to determine the downstream cost $c_{d,u}$ for the particular distribution channel element, the supervisory controller 102 performs operations described by the equation $c_{d,u} = \Sigma_j (c_{d,j} + c_{o,j})$, where j is an index variable that iterates over each immediate downstream distribution channel element for the particular distribution channel element, $c_{d,j}$ is the downstream cost for an immediate downstream distribution channel element, and $c_{o,j}$ is the operational cost for an immediate downstream distribution channel element.

Returning to FIG. 5, in some embodiments, performing the process depicted in FIG. 5 in accordance with the processes depicted in FIGS. 6-7 can result in the hierarchical transitions depicted in the hierarchical transition diagram 800 of FIG. 8. As depicted in the hierarchical transition diagram 800 of FIG. 8, a downstream element upstream cost 801 for a particular distribution channel element is determined based on an upstream element upstream cost 804 for an immediate upstream element associated with the particular distribution channel element as well as an upstream element operational cost 805 for the immediate upstream element associated with the particular distribution channel element. As further depicted in the hierarchical transition diagram 800 of FIG. 8, an upstream element downstream cost 806 associated with a particular distribution channel element is determined based on a downstream element operational cost 802 for an immediate downstream element associated with the particular distribution channel element as well as a downstream element downstream cost 803 for the immediate downstream element associated with the particular distribution channel element.

In some embodiments, operation 503 may be performed in accordance with the operations depicted in FIG. 9, which is a flowchart diagram of an example process for determining a downstream cost for a particular potential set point configuration action with respect to a particular distribution channel element based on demand violation penalties of downstream distribution channel elements associated with the particular distribution channel element. The process depicted in FIG. 9 begins at operation 901 when the supervisory controller 102 determines a demand violation policy for each downstream distribution channel element associated with the particular distribution channel element. A demand violation policy for a downstream distribution channel element may be a measure of deviation of a performance level provided by the downstream distribution channel element from a desired and/or optimal performance level. The supervisory controller 102 may determine a demand violation policy for each downstream distribution channel element associated with the particular distribution channel element, a category that includes but may be broader than each immediate downstream distribution channel element associated with the particular distribution channel element.

At operation 902, the supervisory controller 102 determines the downstream cost for the particular potential set point configuration action with respect to the particular distribution channel element based on each demand violation policy for a downstream distribution channel element associated with the particular distribution channel element. In some embodiments, the supervisory controller 102 determines the downstream cost for the particular potential set point configuration action with respect to the particular distribution channel element based on a maximum demand violation policy from each demand violation policy for a downstream distribution channel element associated with the particular distribution channel element.

Returning to FIG. 5, in some embodiments, performing the process depicted in FIG. 5 in accordance with the processes depicted in FIGS. 6 and 8 can result in the hierarchical transitions depicted in the hierarchical transition diagram 1000 of FIG. 10. As depicted in the hierarchical transition diagram 1000 of FIG. 10, a downstream element upstream cost 1001 for a particular distribution channel element is determined based on an upstream element upstream cost 1004 for an immediate upstream element associated with the particular distribution channel element as well as an upstream element operational cost 1005 for the immediate upstream element associated with the particular distribution channel element. As further depicted in the hierarchical transition diagram 1000 of FIG. 10, an upstream element downstream cost 1006 associated with a particular distribution channel element is determined based on a maximum downstream element demand violation policy 1003 for a particular immediate downstream element associated with the particular distribution channel element and without the downstream element operational cost 1002 for the particular immediate downstream element associated with the particular distribution channel element.

At operation 504, the supervisory controller 102 determines an overall cost measure for the particular potential set point configuration action with respect to the particular distribution channel element based on the operational cost for the particular potential set point configuration action with respect to the particular distribution channel element, the upstream cost for the particular potential set point configuration action with respect to the particular distribution channel element, and the downstream cost for the particular potential set point configuration action with respect to the particular distribution channel element. In some embodiments, to determine the overall cost measure $c_i$ for the particular potential set point configuration action with respect to the particular distribution channel element, the supervisory controller 102 performs operations described by the equation $c_i = c_{r,i} + c_{o,i} + c_{d,i}$, where $c_{r,i}$ is the upstream cost for the particular potential set point configuration action with respect to the particular distribution channel element, $c_{o,i}$ is the operational cost for the particular potential set point configuration action with respect to the particular distribution channel element, and $c_{d,i}$ is the downstream cost for the particular potential set point configuration action with respect to the particular distribution channel element.

At operation 505, the supervisory controller 102 determines the reward measure for the particular potential set point configuration action with respect to the particular distribution channel element based on the operational cost for the particular potential set point configuration action with respect to the particular distribution channel element. In some embodiments, the supervisory controller 102 negates the overall cost measure to determine the reward measure.

Returning to FIG. 3, at operation 304, the supervisory controller 102 generates the supply stream temperature set-point for the particular distribution channel element based on each overall cost measure associated with a potential set point configuration action. In some embodiments, to generate the supply stream temperature set-point for the particular distribution channel element based on each overall cost measure associated with a potential set point configuration action, the supervisory controller 102 computes a deterministic policy h(x) that maximizes the discounted expected return η(h), where the η(h) may be calculated in accordance with the equation $\eta(h) = E_\pi[\Sigma_{i=0}^{\infty} \gamma^i r(x_i, u_i, x_{i+1})]$, where $\gamma^i$ is a discount factor penalizing future reward expectations and $r(x_i, u_i, x_{i+1})$ is the reward from performing the action $u_i$ while in state $x_i$ to transition into the state $x_{i+1}$. In some embodiments, to generate the supply stream temperature set-point for the particular distribution channel element based on each overall cost measure associated with a potential set point configuration action, the supervisory controller 102 utilizes reinforcement learning and/or utilizes a Markov Decision Process.

Additional Example Implementation Details

Although example processing systems have been described in FIGS. 1-2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs (i.e., one or more modules of computer program instructions) encoded on computer-readable storage medium for execution by, or to control the operation of, information/data processing apparatus. Alternatively, or in addition, the program instructions can be encoded on an artificially-generated propagated command (e.g., a machine-generated electrical, optical, or electromagnetic command) which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated command, a computer-readable storage medium can be a source or destination of computer program instructions encoded in an artificially-generated propagated command. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (Application Specific Integrated Circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data (e.g., magnetic, magneto-optical disks, or optical disks). However, a computer need not have such devices. Devices suitable for storing computer program instructions and information/data include all forms of non-volatile memory, media and memory devices, including by way of example semiconductor memory devices (e.g., EPROM, EEPROM, and flash memory devices; magnetic disks, such as internal hard disks or removable disks; magneto-optical disks; and CD-ROM and DVD-ROM disks). The processor and the memory can be supplemented by, or incorporated in, special purpose logic circuitry.

To provide for interaction with a user, embodiments of the subject matter described herein can be implemented on a computer having a display device (e.g., a CRT (cathode ray tube) or LCD (liquid crystal display) monitor) for displaying information/data to the user and a keyboard and a pointing device (e.g., a mouse or a trackball, by which the user can provide input to the computer). Other kinds of devices can be used to provide for interaction with a user as well; for example, feedback provided to the user can be any form of sensory feedback (e.g., visual feedback, auditory feedback, or tactile feedback; and input from the user can be received in any form, including acoustic, speech, or tactile input). In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component (e.g., as an information/data server), or that includes a middleware component (e.g., an application server), or that includes a front-end component (e.g., a client device having a graphical user interface or a web browser through which a user can interact with an implementation of the subject matter described herein), or any combination of one or more such back-end, middleware, or front-end components. The components of the system can be interconnected by any form or medium of digital information/data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. A computer-implemented method for generating a supply stream temperature set point for a particular distribution channel element of a plurality of distribution channel elements associated with a heating, ventilation, and air-conditioning (HVAC) system, the computer-implemented method comprising:
    identifying a hierarchical position of the particular distribution channel element within a hierarchical architecture of the plurality of distribution channel elements;
    identifying a plurality of potential set point configuration actions associated with the particular distribution channel element, wherein each potential set point configuration action of the plurality of potential set point configuration actions is expected to cause transition of the particular distribution channel element from a current state of a plurality of potential states to a future state of the plurality of potential states;
    determining an overall cost measure, the overall cost measure based on an operational cost, an upstream cost, and a downstream cost, for each potential set point configuration action of the plurality of potential set point configuration actions based at least in part on the hierarchical position of the particular distribution channel element; and
    generating the supply stream temperature set point based on each overall cost measure associated with a potential set point configuration action of the plurality of potential set point configuration actions.

2. The computer-implemented method of claim 1, wherein determining the overall cost measure for the each potential set point configuration action of the plurality of potential set point configuration actions comprises:
    determining the operational cost for the potential set point configuration action;

determining the upstream cost for the potential set point configuration action based on the hierarchical position of the particular distribution channel element; and determining the downstream cost for the potential set point configuration action based on the hierarchical position of the particular distribution channel element.

3. The computer-implemented method of claim 2, wherein:

the each potential set point configuration action of the plurality of set point configuration actions is associated with a set point category of a plurality of set point categories; and the plurality of set point categories comprises a flowrate set point category and a temperature set point category.

4. The computer-implemented method of claim 3, wherein the each potential set point configuration action of the plurality of set point configuration actions is associated with a discrete set point modification value of a plurality of discrete set point modification values.

5. The computer-implemented method of claim 3, wherein the each potential set point configuration action of the plurality of set point configuration actions is associated with a continuous set point modification range of a plurality of continuous set point modification ranges.

6. The computer-implemented method of claim 2, wherein:

determining the downstream cost for the potential set point configuration action of the plurality of potential set point configuration actions is performed based on each immediate distribution channel element operational cost and each immediate distribution channel element downstream cost for an immediate downstream distribution channel element of one or more immediate downstream distribution channel elements.

7. The computer-implemented method of claim 2, wherein:

the plurality of distribution channel elements comprise one or more leaf distribution channel elements;

each leaf distribution channel element of the one or more leaf distribution channel elements is associated with one or more covered building zones of a plurality of building zones associated with the HVAC system;

each covered building zone of the one or more covered building zones for a leaf distribution channel element of the one or more leaf distribution channel elements is associated with a zone comfort violation penalty; and each leaf distribution channel element downstream cost for the leaf distribution channel element of the one or more leaf distribution channel elements is determined based on a maximum zone comfort violation penalty for a covered building zone of the one or more covered building zones for the leaf distribution channel element.

8. The computer-implemented method of claim 2, wherein:

the hierarchical position of the particular distribution channel element indicates one or more downstream distribution channel elements of the plurality of distribution channel elements that are associated with the particular distribution channel element;

each downstream distribution channel element of the one or more downstream distribution channel elements is associated with a demand violation penalty; and determining the downstream cost for the potential set point configuration action of the plurality of potential set point configuration actions is performed based on a maximum demand violation penalty for the one or more downstream distribution channel elements.

9. The computer-implemented method of claim 2, wherein:

determining the upstream cost for the potential set point configuration action of the plurality of potential set point configuration actions is performed based on each immediate upstream distribution channel element operational cost and each immediate upstream distribution channel element upstream cost for the immediate upstream distribution channel element.

10. The computer-implemented method of claim 9, wherein determining an immediate upstream distribution channel element upstream cost for the potential set point configuration action of the plurality of potential set point configuration actions comprises:

generating a cost allocation ratio for the immediate upstream distribution channel element with respect to the particular distribution channel element;

applying the cost allocation ratio to a sum of an immediate upstream distribution channel element operational cost for the immediate upstream distribution channel element and an immediate upstream distribution channel element upstream cost for the immediate upstream distribution channel element to generate a parameterized upstream cost value; and determining the immediate upstream distribution channel element upstream cost based on the parameterized upstream cost value.

11. The computer-implemented method of claim 2, wherein:

the plurality of distribution channel elements comprise a root distribution channel element; and a root distribution channel element upstream cost for the root distribution channel element is determined based on a total upstream cost for one or more buildings associated with the HVAC system.

12. The computer-implemented method of claim 1, wherein the generating the supply stream temperature set point based on each overall cost measure associated with the potential set point configuration action of the plurality of potential set point configuration actions comprises:

generating a reward measure for each potential set point configuration action of the plurality of potential set point configuration actions based at least in part on the overall cost measure for the potential set point configuration action;

generating a reward function based on each reward measure for the plurality of potential set point configuration actions; and determining a set point configuration policy that optimizes the reward function.

13. An apparatus comprising at least one processor and at least one non-transitory memory comprising program code, wherein the at least one non-transitory memory and the program code are configured to, with the at least one processor, cause the apparatus to at least perform a method for generating a supply stream temperature set point for a particular distribution channel element of a plurality of distribution channel elements associated with a heating, ventilation, and air-conditioning (HVAC) system, the method comprising:

identifying a hierarchical position of the particular distribution channel element within a hierarchical architecture of the plurality of distribution channel elements;

identifying a plurality of potential set point configuration actions associated with the particular distribution channel element, wherein each potential set point configuration action of the plurality of potential set point configuration actions is expected to cause transition of the particular distribution channel element from a current state of a plurality of potential states to a future state of the plurality of potential states;

determining an overall cost measure, the overall cost measure based on an operational cost, an upstream cost, and a downstream cost, for each potential set point configuration action of the plurality of potential set point configuration actions based at least in part on the hierarchical position of the particular distribution channel element; and generating the supply stream temperature set point based on each overall cost measure associated with a potential set point configuration action of the plurality of potential set point configuration actions.

14. The apparatus of claim 13, wherein determining the overall cost measure for the each potential set point configuration action of the plurality of potential set point configuration actions comprises:

determining the operational cost for the potential set point configuration action;

determining the upstream cost for the potential set point configuration action based on the hierarchical position of the particular distribution channel element; and determining the downstream cost for the potential set point configuration action based on the hierarchical position of the particular distribution channel element.

15. The apparatus of claim 14, wherein the each potential set point configuration action of the plurality of set point configuration actions is associated with a discrete set point modification value of a plurality of discrete set point modification values.

16. The apparatus of claim 14, wherein the each potential set point configuration action of the plurality of set point configuration actions is associated with a continuous set point modification range of a plurality of continuous set point modification ranges.

17. The apparatus of claim 13, wherein:

determining the downstream cost for the potential set point configuration action of the plurality of potential set point configuration actions is performed based on operational costs and downstream costs associated with one or more immediate downstream distribution channel elements.

18. The apparatus of claim 13, wherein:

the plurality of distribution channel elements comprise one or more leaf distribution channel elements;

each leaf distribution channel element of the one or more leaf distribution channel elements is associated with one or more covered building zones of a plurality of building zones associated with the HVAC system;

each covered building zone of the one or more covered building zones for a leaf distribution channel element of the one or more leaf distribution channel elements is associated with a zone comfort violation penalty; and each downstream cost for a leaf distribution channel element of the one or more leaf distribution channel elements is determined based on a maximum zone comfort violation penalty for a covered building zone of the one or more covered building zones for the leaf distribution channel element.

19. A non-transitory computer storage medium comprising instructions configured to cause one or more processors to at least perform a method for generating a supply stream temperature set point for a particular distribution channel element of a plurality of distribution channel elements associated with a heating, ventilation, and air-conditioning (HVAC) system, the method comprising:

identifying a hierarchical position of the particular distribution channel element within a hierarchical architecture of the plurality of distribution channel elements;

identifying a plurality of potential set point configuration actions associated with the particular distribution channel element, wherein each potential set point configuration action of the plurality of potential set point configuration actions is expected to cause transition of the particular distribution channel element from a current state of a plurality of potential states to a future state of the plurality of potential states;

determining an overall cost measure, the overall cost measure based on an operational cost, an upstream cost, and a downstream cost, for each potential set point configuration action of the plurality of potential set point configuration actions based at least in part on the hierarchical position of the particular distribution channel element; and generating the supply stream temperature set point based on each overall cost measure associated with a potential set point configuration action of the plurality of potential set point configuration actions.

20. The non-transitory computer storage medium of claim 19, wherein determining the overall cost measure for the potential set point configuration action of the plurality of potential set point configuration actions comprises:

determining the operational cost for the potential set point configuration action;

determining the upstream cost for the potential set point configuration action based on the hierarchical position of the particular distribution channel element; and determining the downstream cost for the potential set point configuration action based on the hierarchical position of the particular distribution channel element.

* * * * *